Figure 1:
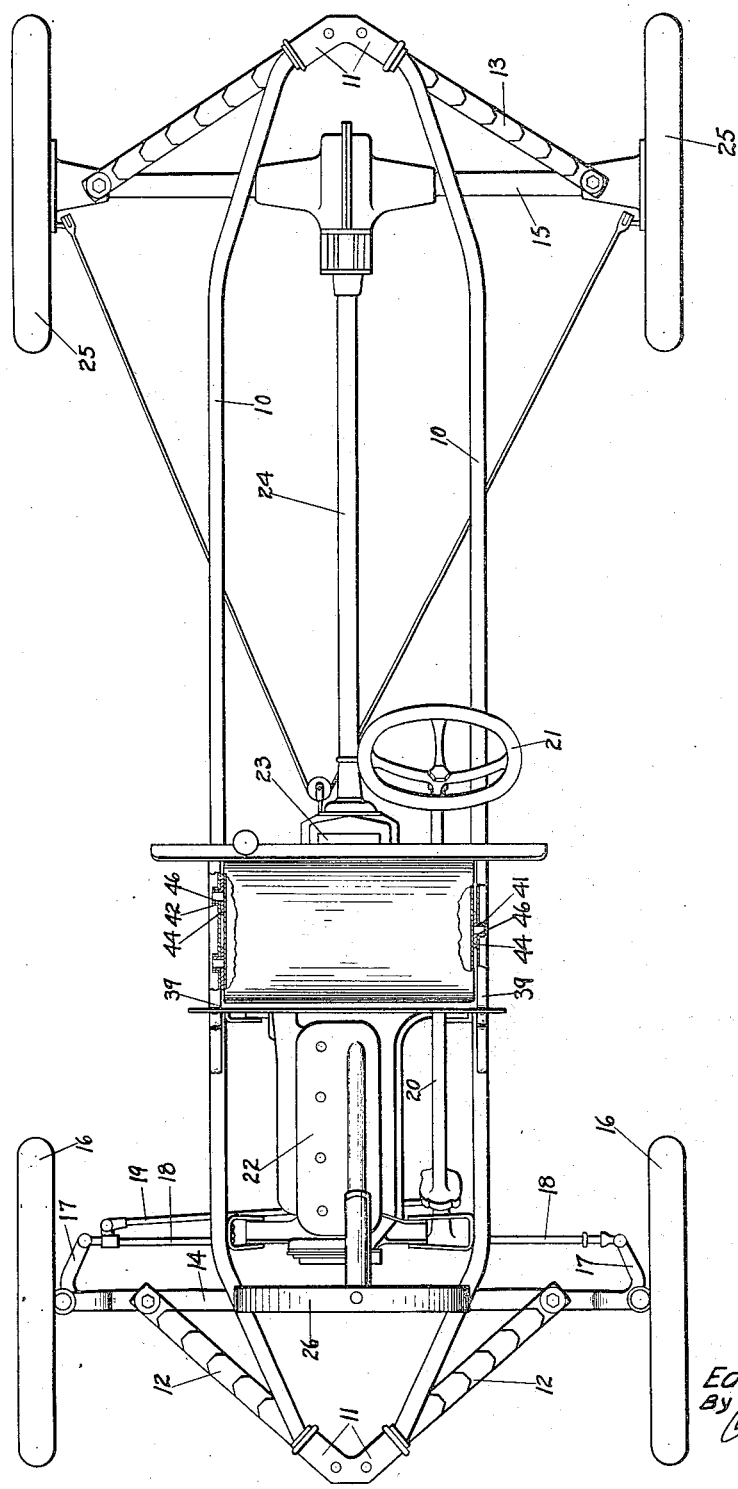

May 8, 1923.

E. H. BELDEN

MOTOR VEHICLE

Filed Jan. 6, 1919

1,454,597

4 Sheets-Sheet 1

INVENTOR.
Edward H. Belden
By Chester H Broselton
ATTORNEY

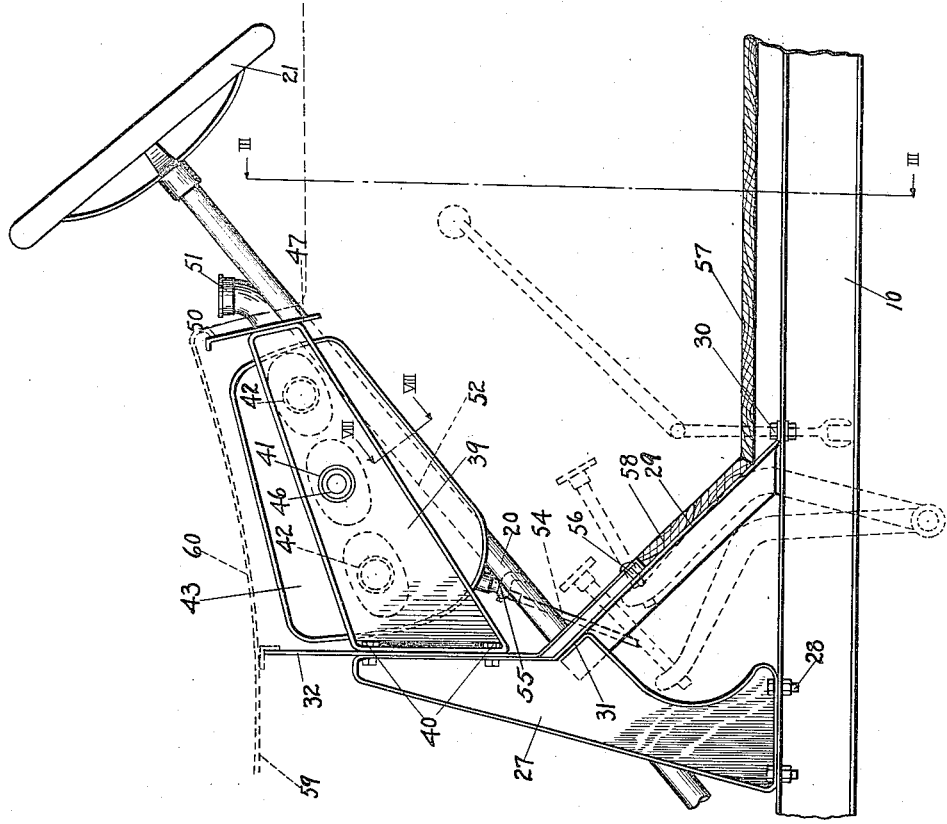

May 8, 1923.
E. H. BELDEN
MOTOR VEHICLE
Filed Jan. 6, 1919
1,454,597
4 Sheets-Sheet 3
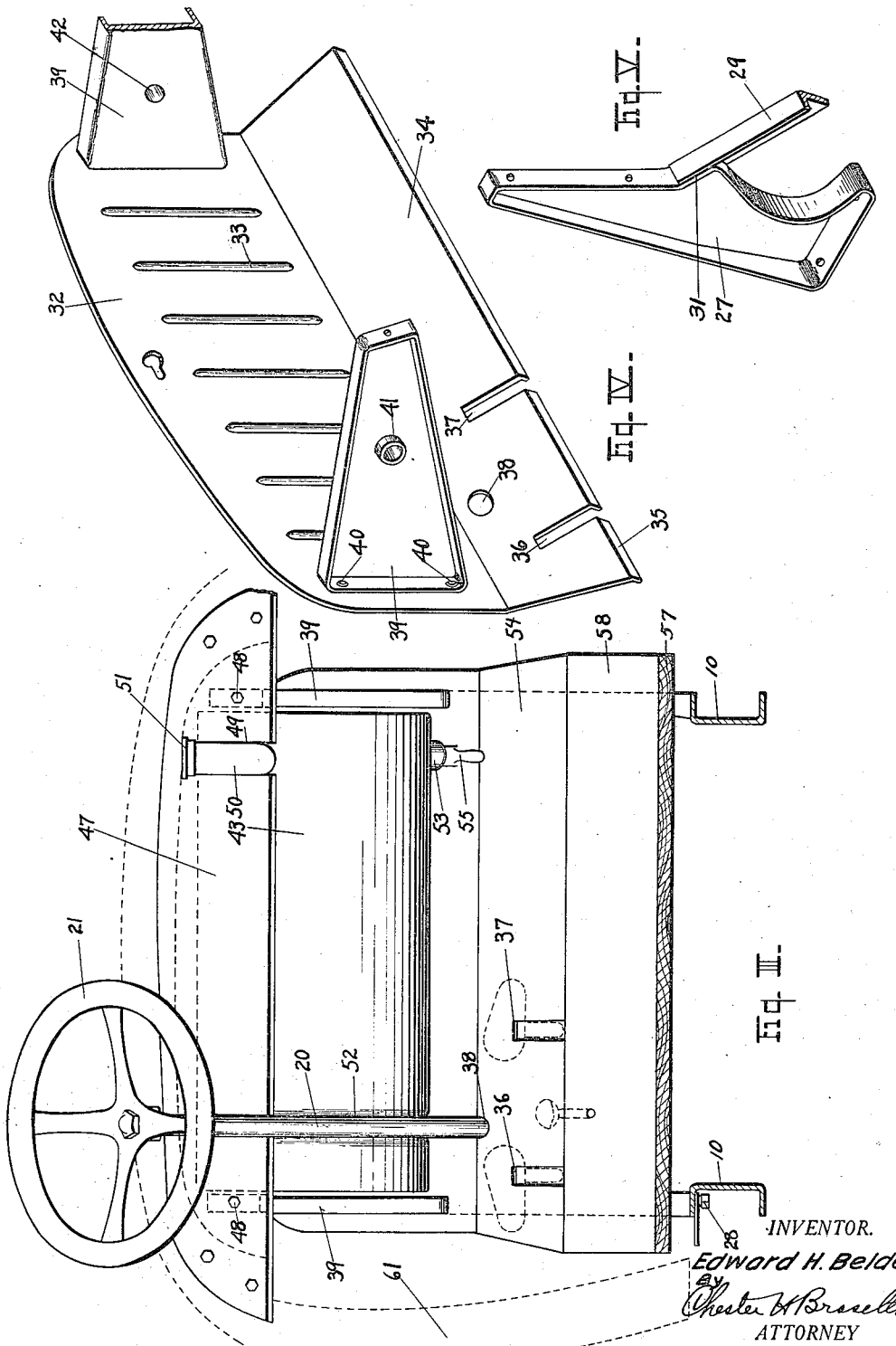
INVENTOR.
Edward H. Belden
By
Chester H. Brosselton
ATTORNEY May 8, 1923.
E. H. BELDEN
MOTOR VEHICLE
Filed Jan. 6, 1919
1,454,597
4 Sheets-Sheet 4
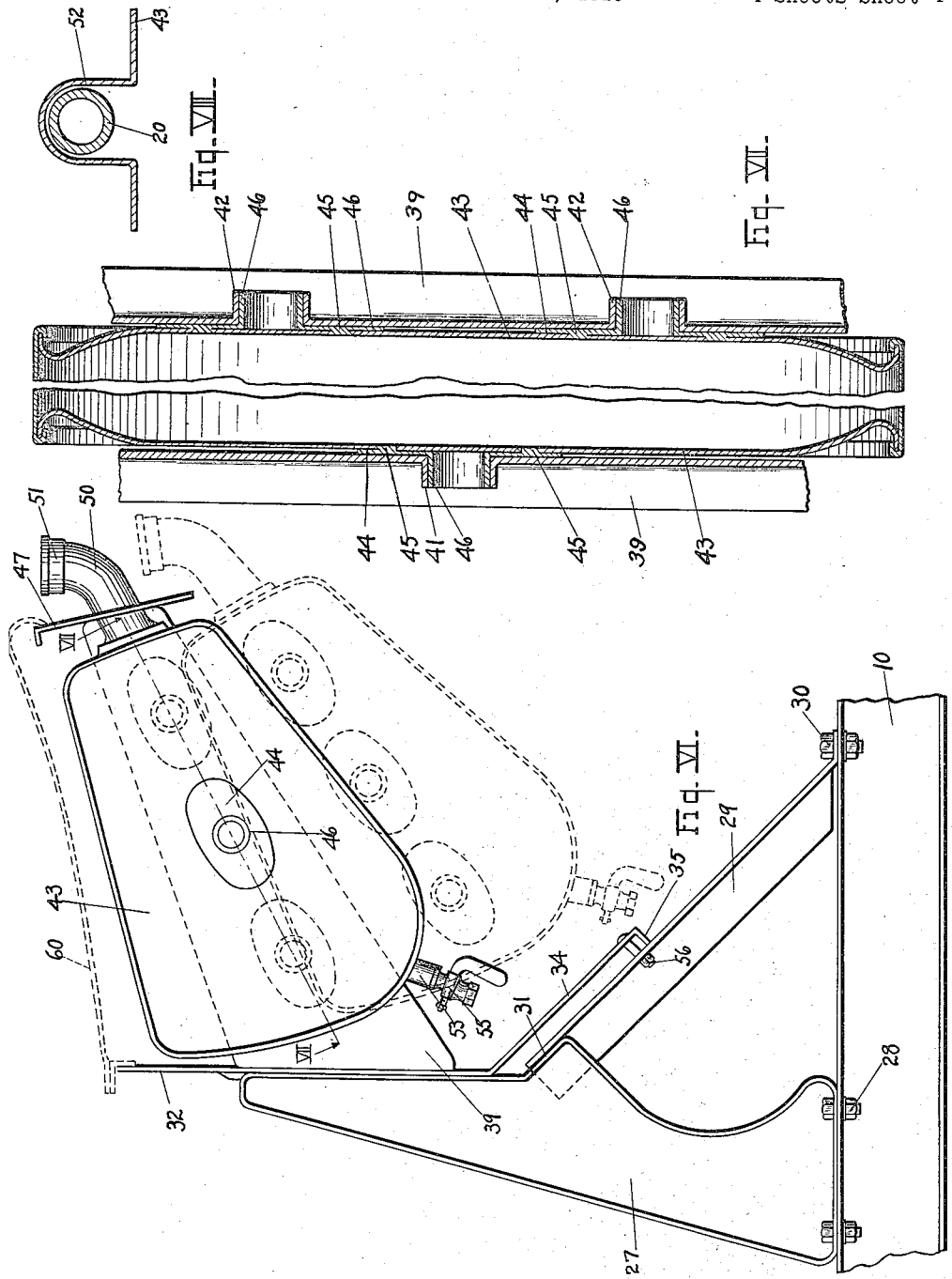
INVENTOR.
Edward H. Belden
BY
ATTORNEY Patented May 8, 1923.

1,454,597

UNITED STATES PATENT OFFICE.

EDWARD HALE BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

MOTOR VEHICLE.

Original application filed September 12, 1917, Serial No. 190,966. Divided and this application filed January 6, 1919. Serial No. 269,805.

*To all whom it may concern:*

Be it known that I, EDWARD H. BELDEN, residing at Toledo, county of Lucas, and State of Ohio, have invented certain new and useful Improvements in Motor Vehicles, of which I declare the following to be a full, clear, and exact description.

This invention relates to improvements in motor vehicles and particularly to the construction of the chassis of the motor vehicle.

This application is a division of my copending application, Serial Number 190,966 filed September 12, 1917.

One of the objects of my invention is to provide a construction in which the fuel tank and instrument board are directly mounted on the frame so as to be enclosed within the cowl when the body is fastened in position on the frame.

A further object of my invention is to provide improved means for supporting the fuel tank adjacent the instrument board, together with an improved type of dash and instrument board and support therefor.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawings, forming a part hereof, in which:

Figure I is a top plan view of a motor vehicle chassis embodying my invention.

Figure II is a fragmentary view, in side elevation, of a motor vehicle chassis embodying my invention, the body, cowl, hood, gear shift, clutch and brake levers being shown in dotted lines.

Figure III is a fragmentary view, taken substantially on the line III—III of Figure II, and showing the dash board, fuel tank and instrument board in front elevation, the cowl and body being shown in dotted lines.

Figure IV is a detail, perspective view of the dash board and the arms connected thereto and extending rearwardly therefrom for supporting the fuel tank.

Figure V is a detail, perspective view showing one of the standards to which the dash board is secured.

Figure VI is an enlarged, detail view, similar to the left hand part of Figure II, one of the tank supporting arms being removed and the tank being shown by dotted lines in the position to which it is moved when it becomes necessary to remove the tank from its supporting frame.

Figure VII is a fragmentary, detail, sectional view, taken substantially on the line VII—VII of Figure VI.

Figure VIII is a fragmentary, detail, sectional view, taken substantially on the line VIII—VIII of Figure II.

Considering the numbered parts of the drawing, I have shown the chassis of a motor vehicle comprising a frame made up of longitudinally extending bars 10 which are connected at their ends by the plates 11, said frame being supported at the front end from the front axle 14 by the springs 12 and, at the rear end, from the rear axle 15 by the springs 13. The front steering wheels 16 are carried by the front axle in the usual manner and the steering arms 17 are connected by the rod 18, and operated through the rod 19 connected with the steering column 20, having the steering wheel 21. An engine 22 is mounted on the forward part of the frame and is connected with the rear axle through the clutch and transmission housed in the casing 23 and the propeller shaft housed within the tube 24 in the usual manner. The rear driving wheels 25 are mounted on the rear axle 15 in the usual manner. The radiator 26 is supported on the frame in any suitable manner in front of the engine.

A standard 27 is secured to each side bar 10 just in the rear of the engine 22 by means of the bolts 28 and said standard extends vertically upward and is braced by the angle bar 29 connected to the side bar 10 by the bolt 30, the upper end of said angle bar 29 being secured to the standard 27 at 31 by spot welding or in any other suitable manner. The vertical portion 32 of the dash is provided with vertically extending parallel corrugations 33 which stiffen the same and the dash has the portion 34 which extends rearwardly and downwardly from the lower edge of said vertical portion. A flange 35 extends inwardly at right angles to the lower edge of said inclined portion 34 and slots 36 and 37 are formed in said inclined portion to accommodate the usual foot levers and an opening 38 is formed therein to accommodate the steering column 20. Arms 39 are secured adjacent the vertical edges of said dash board 32 by means of the bolts 40 extending through said dash board and the flanged edge of the corresponding standard 27, and said arms extend upwardly and rearwardly from said dash board, as clearly appears in Figures II and IV. One of said arms is provided with a boss 41, having an opening, and the other arm is provided with a pair of bosses 42 having openings for the trunnions on the fuel tank 43 which is carried by and disposed between said arms 39. Plates 44 are secured to the end walls of the tank 43 by spot welds 45 and said plates are provided with trunnions 46 adapted to fit in the bosses 41 and 42 respectively. The fuel tank is supported in this manner between the arms 39 extending upwardly and rearwardly from the dash board. The instrument board 47 is fastened to the rear ends of said arms 39 by means of the bolts 48 and a notch 49 is provided in said instrument board to accommodate the filling nozzle 50 of the tank 43, said nozzle having a cap 51. A groove 52 is formed in the lower side of the tank 43, extending transversely thereof, and so positioned as to accommodate the steering column 20, as clearly appears from Figures II and VIII. The nipple 53 is connected to the lower part of the tank 43 and connected with the fuel line 54 by means of the shut-off cock 55. The floor board 57 is carried by the frame in the usual manner and the toe board 58 is supported on the angle bars 29 so that its upper edge abuts the down-turned flange 35 of the dash board, the inclined portion 34 of the dash board being secured to said angle bars 29 by means of the bolts 56. The hood 59, the cowl 60 and the body 61, are indicated by dotted lines.

From the description of the parts given above, the essential features of this construction should be very readily understood. The dash board 32, the fuel tank 43 and the instrument board 47 are all supported directly from the frame of the motor vehicle, the fuel tank being supported between the arms 39 which are attached to the standards 27 and the instrument board 47 being secured to the rear ends of said arms. In this way the tank may be carried in the cowl, as it is enclosed within the cowl when the body is fastened in place, and the tank and instrument board may nevertheless be mounted in place on the chassis before the body is attached. This is of considerable importance in view of the fact that motor vehicles are usually tested before the body is attached and all of the parts that are necessary to the operation of the power plant are mounted in the position which they are to occupy in the finished car before the body is attached. Heretofore, when the fuel tank is carried in the cowl, it has been necessary to mount a temporary tank on the frame when the car was being tested, as the permanent fuel tank was carried by the body and was mounted in place when the body was attached to the frame.

This makes a very staunch and sturdy construction and one which renders it a comparatively simple matter to remove the tank in case its repair is necessary. To do this the steering column is removed and the connection between the tank and the fuel line is broken, the bolts 40 which secure one of the arms 39 to the standard 27 are loosened and the arm 39 is removed to one side so that the trunnion 46 is released from its bearing 41. The tank can then be moved sidewise to release the opposite trunnions 46 from their bearings 42 and the fuel tank can be dropped down, as shown in dotted lines in Figure VI until its upper edge clears the lower edge of the instrument board, when the tank can be moved rearwardly and entirely removed.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. In a motor vehicle, the combination of a vehicle frame comprising a pair of longitudinally extending side bars, a dash board and an instrument board carried by said frame, a body carried by said frame and a fuel tank within said body and between said dash board and said instrument board and supported by said frame independently of said body.

2. In a motor vehicle, the combination of a vehicle frame, a pair of standards carried by said frame, a dash board secured to said standards, an instrument board positioned rearwardly of said standards and supported therefrom, and a fuel tank carried by said standards and located between the dash board and instrument board.

3. In a motor vehicle, the combination of a vehicle frame, a pair of standards carried by said frame, a dash board secured to said standards, a pair of arms secured to said standards and projecting from said dash board, and a fuel tank mounted between said arms.

4. In a motor vehicle, the combination of a vehicle frame, a pair of standards carried by said frame, a dash board carried by said standards, a pair of arms extending rearwardly from said dash board, an instrument board secured to the rear ends of said arms, and a fuel tank mounted between and carried by said arms between said instrument board and said dash board.

5. In a motor vehicle, the combination of a vehicle frame, a pair of standards carried by said frame, a dash board secured to said standards, a steering column extending forwardly through said dash board, an instrument board carried by the ends of said arms, and a fuel tank carried by said arms between said instrument board and said dash board and above said steering column.

6. In a motor vehicle, the combination of a vehicle frame, a pair of standards carried by said frame, a dash board secured to said standards, a steering column extending through said dash board, a pair of arms extending rearwardly from said dash board, an instrument board secured to the ends of said arms, and a fuel tank carried by said arms between said dash board and said instrument board, said fuel tank being provided with a transversely extending recess accommodating said steering column when said fuel tank is in position.

7. In a motor vehicle, the combination of a vehicle frame, a pair of standards carried thereby, a dash board secured to said standards, a pair of arms extending rearwardly from said dash board, an instrument board secured to the rear ends of said arms, each of said arms being provided with openings, and a fuel tank mounted between said arms and having the ends thereof provided with trunnions disposed in said openings.

8. In a motor vehicle, the combination of a vehicle frame, comprising a pair of longitudinally extending side bars, a standard secured to each of said side bars, a dash board comprising a vertical portion secured to the upper ends of said standards and a downwardly and rearwardly extending portion provided with slots to accommodate the usual foot levers and an opening through which the steering column passes, a pair of arms secured to said standard adjacent the edges of the vertical portion of said dash board and extending upwardly and rearwardly, an instrument board secured to the rear ends of said arms, and a fuel tank carried by said arms and mounted between said instrument board and said dash board.

9. In a motor vehicle, the combination of a vehicle frame, a body comprising a cowl, a fuel tank beneath said cowl and means for supporting said fuel tank directly from said frame and independently of said body.

10. In a motor vehicle, the combination of a frame, a dash board, an instrument board, a fuel tank therebetween, means for supporting said dash board, instrument board and fuel tank directly from said frame and a body separate from but engaging said dash board and instrument board and enclosing said fuel tank.

11. In a motor vehicle, the combination of a vehicle frame, a pair of standards carried by the frame independently of the vehicle body, and a fuel tank and instrument board supported by said standards.

12. In a motor vehicle, the combination of a vehicle frame, a pair of standards carried by said frame, a pair of arms secured to the standards and projecting rearwardly therefrom, and a fuel tank supported by the standards and having a portion thereof positioned between the rearwardly extending arms.

13. In a motor vehicle, the combination of a vehicle frame, a flooring for the vehicle including a toe-board, a pair of standards carried by the frame and each provided with an abutment for supporting a portion of the toe-board.

14. In a motor vehicle, the combination of a frame, a pair of standards mounted thereon, a brace for each of said standards extending diagonally downward therefrom to said frame, a dash board supported by said standards and having a portion overlying said braces and a toe board supported by said braces.

15. In a motor vehicle, the combination of a frame, a pair of standards carried by the frame, a pair of arms secured to said standards and extending rearwardly therefrom, and an instrument board carried by said arms.

16. In a motor vehicle, the combination of a frame comprising side frame members, a standard carried by each of said side frame members, an arm carried by each standard and extending rearwardly and upwardly therefrom, and an instrument board supported by the said arms adjacent the rearward ends thereof.

17. In a motor vehicle, the combination of a vehicle frame, a pair of standards carried by the frame independently of the vehicle body, arms secured to the standards and extending rearwardly therefrom, an instrument board carried by the arms, and a fuel tank located rearwardly of said standards and between said arms.

18. In a motor vehicle, the combination of a frame, a dash board, arms extending rearwardly from and supported by the dash-board, an instrument board, and a fuel tank carried by the rearwardly extending arms and positioned between the dash-board and instrument board.

19. In a motor vehicle, the combination of a frame, a vehicle body including a cowl, a fuel tank and instrument board firmly secured together and supported from said frame independently of the vehicle body and in position to be enclosed within the cowl of the vehicle body when said body is secured on the frame.

In testimony whereof, I affix my signature.

EDWARD HALE BELDEN.